(12) United States Patent
Jost

(10) Patent No.: US 6,883,870 B2
(45) Date of Patent: Apr. 26, 2005

(54) HEAD REST, PARTICULARLY FOR A MOTOR VEHICLE SEAT

(75) Inventor: Gilbert Jost, Bettange/Mess (LU)

(73) Assignee: Security Vision Concept, Luxembourg (LU)

( * ) Notice: Subject to any disclaimer, the term of this patent is extended or adjusted under 35 U.S.C. 154(b) by 0 days.

(21) Appl. No.: 10/469,458

(22) PCT Filed: Mar. 20, 2002

(86) PCT No.: PCT/EP02/03110

§ 371 (c)(1),
(2), (4) Date: Aug. 29, 2003

(87) PCT Pub. No.: WO02/074577

PCT Pub. Date: Sep. 26, 2002

(65) Prior Publication Data

US 2004/0113479 A1 Jun. 17, 2004

(30) Foreign Application Priority Data

Mar. 21, 2001 (FR) .......................... 01 03795

(51) Int. Cl.[7] ................................. A47C 7/36
(52) U.S. Cl. ................. 297/391; 297/217.3; 297/408
(58) Field of Search ................. 297/217.3, 408, 297/391

(56) References Cited

U.S. PATENT DOCUMENTS

| | | | | |
|---|---|---|---|---|
| 3,608,965 A | * | 9/1971 | Cziptschirsch et al. | 297/410 |
| 4,427,233 A | * | 1/1984 | Matumoto | 297/391 |
| 4,991,907 A | * | 2/1991 | Tanaka | 297/408 |
| 5,507,556 A | * | 4/1996 | Dixon | 297/217.3 |
| 5,660,441 A | * | 8/1997 | Nagayasu et al. | 297/408 |
| 6,022,078 A | * | 2/2000 | Chang | 297/391 |
| 6,217,118 B1 | * | 4/2001 | Heilig | 297/410 |
| 6,250,967 B1 | * | 6/2001 | Chu | 439/668 |
| 6,669,285 B1 | * | 12/2003 | Park et al. | 297/217.3 |
| 6,698,832 B1 | * | 3/2004 | Boudinot | 297/217.4 |

FOREIGN PATENT DOCUMENTS

JP 200 047921 A * 2/2001

* cited by examiner

Primary Examiner—Peter M. Cuomo
Assistant Examiner—Joseph Edell
(74) Attorney, Agent, or Firm—Thomas S. Baker, Jr.

(57) ABSTRACT

The invention relates to a headrest, particularly for a motor vehicle seat, comprising a cushion made from synthetic foam which houses an integrated support that can be used to fix two parallel anchor rods to the seat. According to the invention, the anchor rods are fitted with threaded shafts that extend at a right angle from the upper end of said rods. The threaded shafts are each screwed into one end of a housing body in the form of a cylindrical sleeve having a suitable internal threading. Tightening locknuts are used to lock the anchor rods in position on the cylindrical sleeve. Said cylindrical sleeve is fixed to a locking lug, which is disposed on the integrated support, by means of a stirrup piece which is associated with a screw-nut type tightening system.

11 Claims, 4 Drawing Sheets

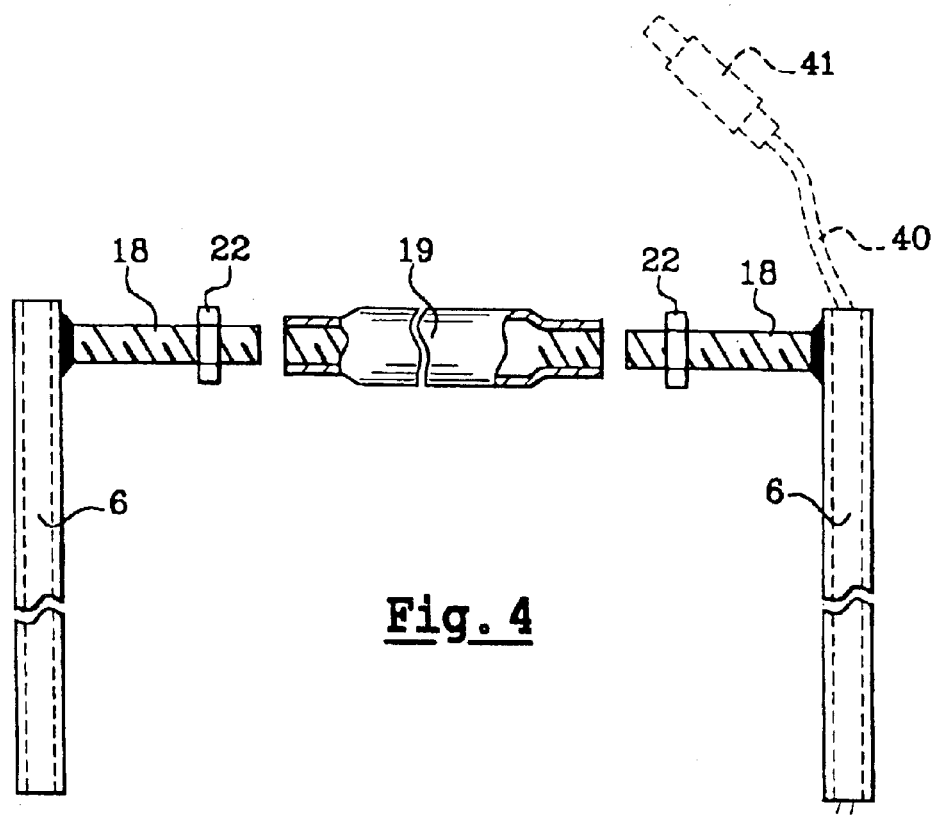
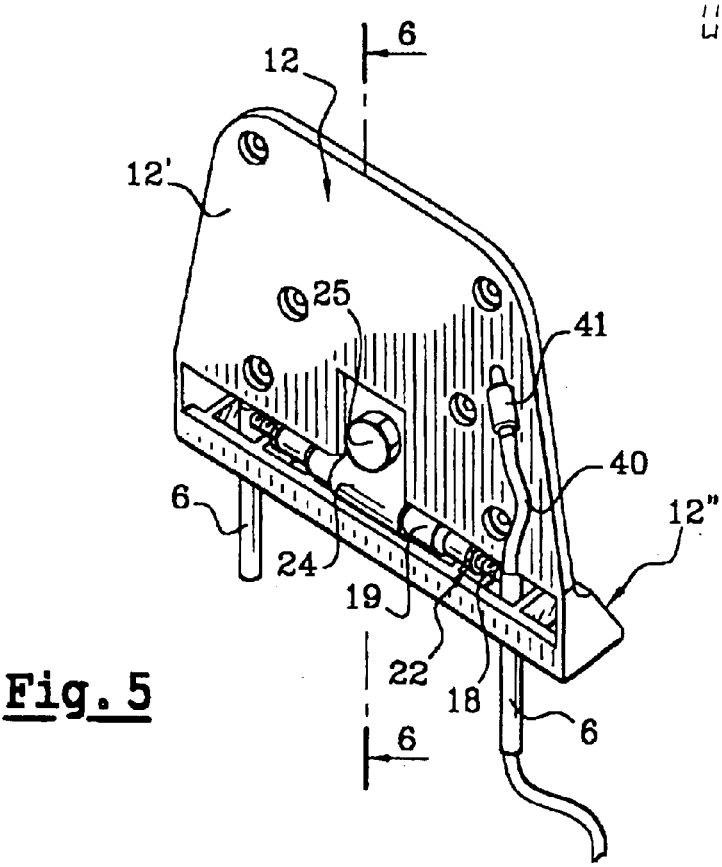

HEAD REST, PARTICULARLY FOR A MOTOR VEHICLE SEAT

CROSS-REFERENCE

None.

PRIORITY

This Application claims the priority of international patent number PCT/EP02/03110 field Mar. 20, 2002, published Sep. 26, 2002 under WO 02/074577 and based on French application number FR 01033795 filed Mar. 21, 2001.

FIELD OF THE INVENTION

The present invention is related to a new headrest structure for motor vehicle seats, or other types of seats.

BACKGROUND OF THE INVENTION

Traditional headrests used to equip motor vehicle seats are made of a synthetic foam cushion, covered with a slipcover structure made of cloth, synthetic material or leather, and include a stiff insert that enables two parallel anchor rods to get fitted into the housing sleeves installed on the upper portion of the equipped seat.

In some headrest structures, the distance between the anchor rods cannot be adjusted; as a result, during the manufacturing process itself, it becomes necessary to provide different versions of the headrests, depending on the distance between the housing sleeves in the seat intended to receive it.

In other known models, as described for example in U.S. patent application Ser. No. 6,022,078, German Patent Application 196 52 591, or even French Patent Application 2 796 017, the distance between the anchor rods is variable, but the internal fitting means by way of which these rods are adapted to this variability, are relatively complex.

Furthermore, as can be seen in U.S. patent application Ser. No. 5,713,633 or German Patent Application 196 01 582, some of the more recent headrest models are equipped with monitors, particularly of the liquid crystal type, for DVD players, game consoles and the like, that are integrated into the rear face of the headrests so as to be accessible from the rear seats of the vehicle. The presence of these monitors further complicates the integrated fitting structure of the headrest.

SUMMARY OF THE INVENTION

A first object of the present invention is to propose a new headrest structure equipped with anchor rods at a variable distance from one another, of simple design and easy to install.

To this end, the headrest according to the present invention consists of anchor rods fitted with threaded shafts that extend at a right angle from the upper end of the rods; these threaded shafts are each screwed into one end of a body equipped with suitable internal threading and linked to fixing means on a support base integrated into the synthetic foam cushion.

According to a preferred embodiment, the threaded shafts linked to the anchor rods each have a locknut intended to abut the body, so as to lock the anchor rods into position.

Further, according to a preferred embodiment, the body of the threaded shafts has a cylindrical sleeve housed in the base of a flat U-shaped stirrup piece; this U-shaped stirrup piece encloses a locking lug arranged on the integrated support, and is affixed to the locking lug by a screw-nut type of tightening system.

The integrated support preferably has a seat adapted to receive the cylindrical sleeve and the threaded shafts that extend the upper ends of the anchor rods at a right angle. This seat exits either onto the front or back face of the support; it is positioned just below the locking lug of the U-shaped stirrup piece and has lower openings for the passage of the anchor rods. These openings are adapted to a variety of possible distances between the anchor rods.

According to yet another characteristic, the integrated support has an opening situated below the locking lug of the U-shaped stirrup piece in order to facilitate the positioning of the stirrup piece.

In an effort to provide almost universal functionality to the headrest as disclosed by the present invention, adapter sleeves are attached thereto, that are capable of compensating for the potential difference between the outer diameter of the anchor rods and the inner diameter of the housing sleeves installed in the upper portion of the equipped seat. These attached sleeves preferably have an upper flange that allows them to stay in position on the housing sleeves.

Another object of the present invention is to set forth a new, simplified structure for a headrest into which a monitor of the liquid crystal type, for example, for DVD players, game consoles and the like has been integrated.

According to the present invention this monitor is embedded in the rear face of the headrest and is moveably clamped into a casing which is itself embedded in the rear face and fixed on the integrated support.

According to a preferred embodiment, the monitor casing is embedded in an opening situated in the rear face of the headrest, the opening being delimited by a rigid frame whose width largely corresponds to the thickness of the casing, and along the inner rim of which the integrated support comes to rest. The base of the monitor casing is fixed to the integrated support via locking screws and the front face of this housing is equipped with an oversized peripheral flange designed to come to rest against the outer rim of the rigid frame.

The synthetic foam forming the headrest cushion is advantageously molded onto this rigid frame.

Again according to the invention, the headrest anchor rods are hollow and the power supply cables of the integrated monitor pass through at least one of these rods.

Further non-restrictive illustrations of the invention can be found in the following description of a preferred embodiment, provided only as one example thereof, and is illustrated in the annexed drawings wherein.

BRIEF DESCRIPTION OF THE DRAWINGS

FIG. 4 is an enlarged front view showing details of the assembly of the anchor rods on the cylindrical housing sleeve;

FIG. 5 is a perspective view of the integrated support on which the variable-distance anchor rods are fixed;

DETAILED DESCRIPTION

Figure 1:
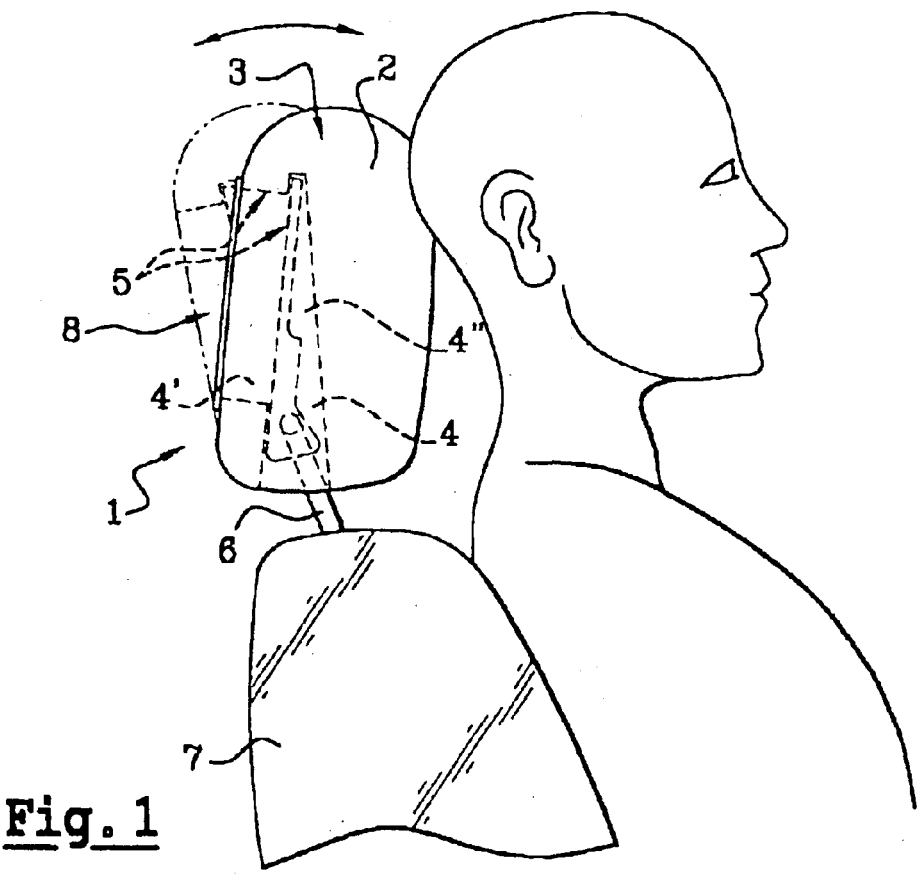
FIG. 1 is a schematic side view of a headrest according to the present invention, positioned on the seat of a motor vehicle.
Figure 2:
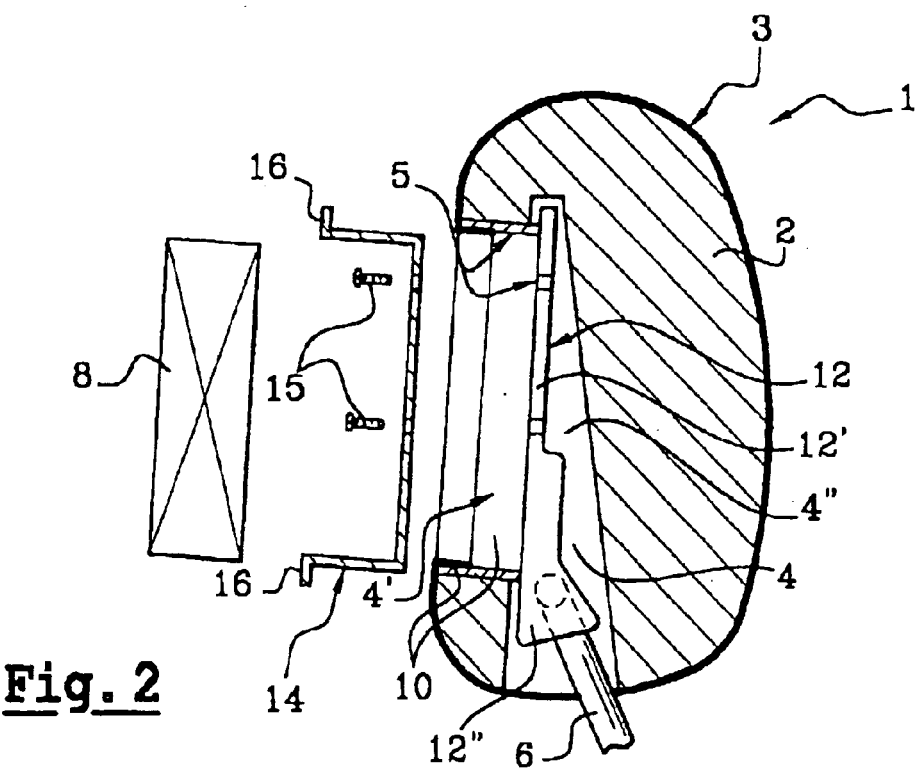
FIG. 2 is a schematic view of a headrest, in a partially exploded transverse section.

As illustrated in FIGS. 1 and 2, headrest 1 is made up of a synthetic foam cushion 2 covered by a slip-cover 3 structure made of cloth, synthetic material or leather.

A housing 4 is disposed inside cushion 2 to receive a support structure 5 intended to fit the two parallel rods 6 that enable headrest 1 to become anchored on top of seat 7 of the vehicle, as well as to fit an embedded monitor 8 such as of the liquid crystal type (LCD) for DVD players, game consoles or the like. Monitor 8 is embedded in the rear face of headrest 1 so as to be accessible from the rear seats of the vehicle.

Support structure 5 is made up of:
- a rigid frame 10, made either of metal or plastic, that delimits rear portion 4' of housing 4 (this part of housing 4' is generally shaped like a parallelepiped and ends at the rear face of cushion 2 so as to allow the monitor to become embedded) and
- a support 12 integrated into front portion 4" of housing 4 (this part of housing 4" ends at the lower face of cushion 2).

Integrated support 12 comes to rest against the inner rim of rigid frame 10. It is affixed to the latter by means of a casing 14 that gets inserted into a part of housing 4' and is disposed to receive LCD monitor 8. The thickness of casing 14 essentially corresponds to the width of rigid frame 10; its base is fixed on support 12 by means of screws 15 and it comprises an oversize peripheral flange 16 adapted to come to rest against the outer rim of rigid frame 10.

Once locking screws 15 are put in place, the assembly is of course held correctly inside foam cushion 2. In order to further improve this hold, foam cushion 2 can be molded onto rigid frame 10.

Support 12 is a one-piece attachment and is made, for example, from a molded plastic material. It has a platform 12' whose dimensions are slightly greater than those of rigid frame 10, and extends downward via an extension 12", details of whose structure are provided later in the description.

The two anchor rods 6 of the headrest are fitted on integrated support 12 as illustrated in FIGS. 3 through 6.

In this instance, both these anchor rods 6 are hollow metallic rods, at the upper ends whereof are soldered, at right angles, threaded shafts 18 adapted to be screwed into the ends of the body 19 shaped like a cylindrical sleeve. The inner threading of sleeve 19 is, of course, adapted to conform with the outer threading of threaded shafts 18.

It is therefore understood that sleeve 19 acts as a connecting element between hallow rods 6, and allows for the very easy adjustment of the distance between both these rods 6 by adjusting the thread length of the threaded shafts 18.

Figure 3:
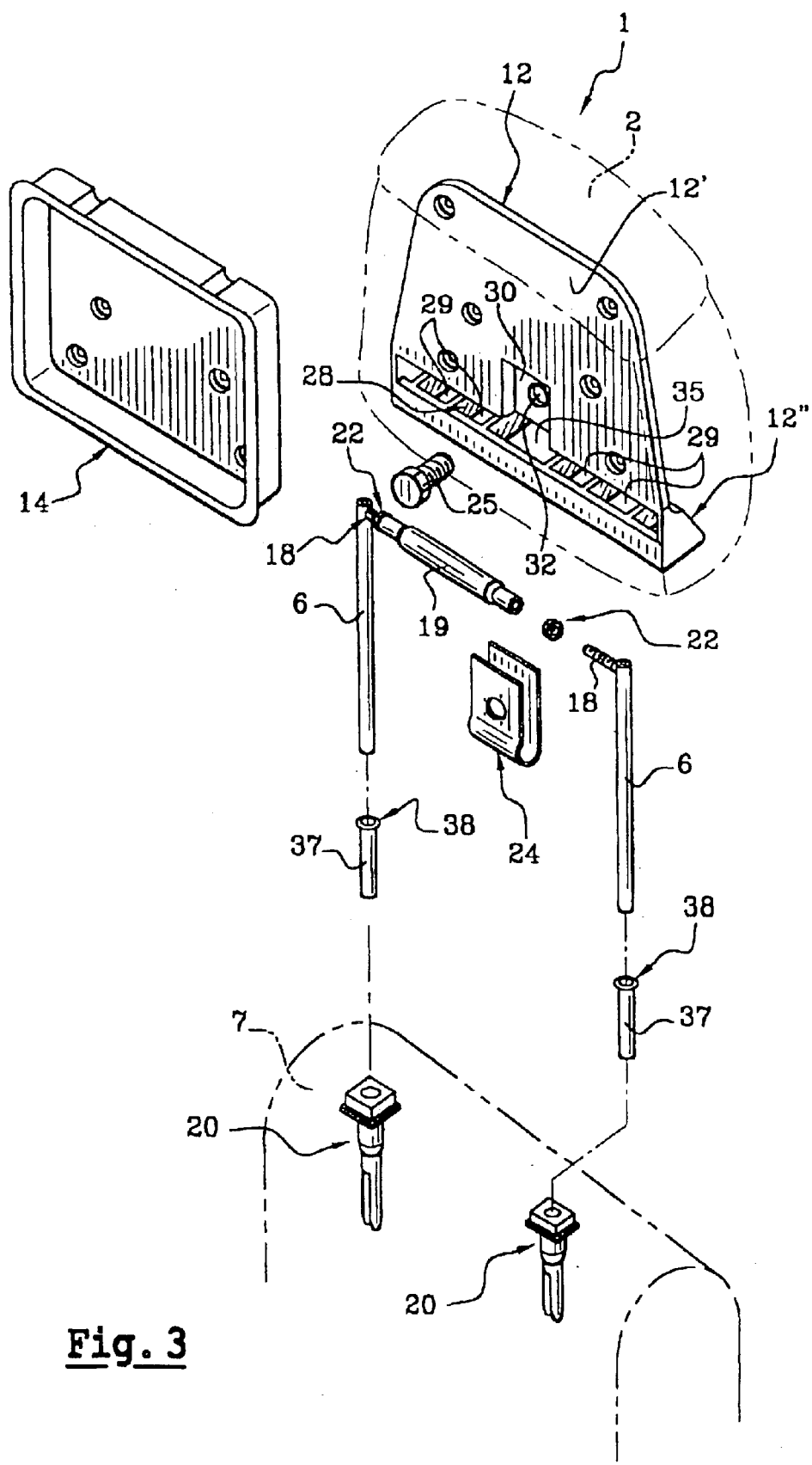
FIG. 3 is an exploded perspective view illustrating the principle by which the anchor rods are fitted to the integrated support of the headrest.
Figure 6:
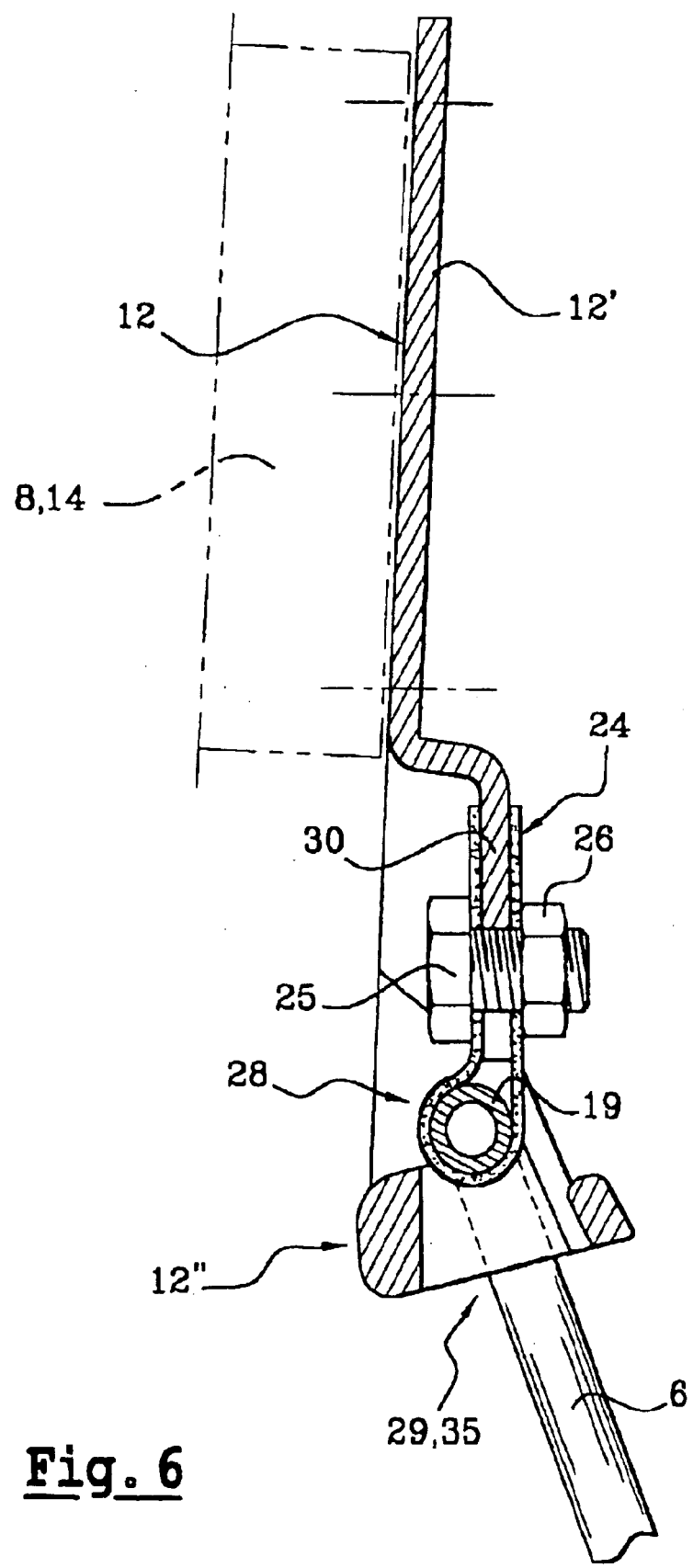
FIG. 6 is an enlarged sectional view along section 6—6 of FIG. 5.

The distance between rods 6 is adjusted according to the distance between housing sleeve 20 that equips seat 7 of the vehicle. This center distance is maintained by tightening locknuts 22 with which threaded shafts 18 are equipped (FIGS. 3, 4 and 5).

This assembly 6, 18, 19 is fitted onto support 12 by means of a flat, U-shaped stirrup piece 24 connected to a screw-nut 25–26 type of tightening system.

To do this, sleeve 19 with threaded shafts 18 and lock nuts 22 are inserted into a longitudinal seat 28 situated in lower extension 12" of support 12. This seat 28 ends at the front face of support 12 and has openings 29 that are oriented downward for the passage of anchor rods 6; these lower openings 29 are adapted to conform to the various potential distances between rods 6.

U-shaped stirrup piece 24 envelops cylindrical sleeve 19 and becomes positioned on either side of a locking lug 30 arranged in the central portion of the support 12, just above seat 28. This locking lug 30 has an opening 32 for the passage of the screw-nut tightening system 25–26.

The positioning of stirrup piece 24 is facilitated by the presence of an opening 35 in extension 12' of support 12, beneath locking lug 30.

Rods 6 are fitted on support 12 before support 12 is inserted into cushion 2 of the headrest. Once support 12 and casing 14 have been correctly positioned and fitted, the cover of headrest 3 can be replaced or repositioned as needed.

In a variation of the embodiment, seat 28 can end similarly at the back face of support 12. One may also envision the presence of one-piece elements situated along the edge of seat 28 so as to block the positioning of cylindrical sleeve 19.

In a known manner, anchor rods 6 may comprise a system of serrations that allow adjustments in the position of the height of the headrest on housing sleeves 20 of seat 7.

If the diameter of rods 6 is not adapted to the diameter of housing sleeves 20, adapter sleeves 37 may be used, as shown in FIG. 3, which allow for the compensation of size differences. These adapter sleeves 37 have an upper flange 38 which allows them to be held in position on housing sleeves 20; the outer diameter of adapter sleeves 37 is adapted to the inner diameter of housing sleeves 20, and their inner diameter is adapted to the outer diameter of anchor rods 6.

In order to provide a certain universality of use, a complete set of adapter sleeves 37, corresponding to the various potential dimensions of housing sleeve 20, may be offered with headrest 1.

As shown in FIG. 1, once in place, the inclination of the headrest can be adjusted by a slight, though forceful pivoting of support 12 about cylindrical sleeve 19. The tightening of screw-nut system 25–26 is adapted to allow for this adjustment in inclination.

FIGS. 3, 4 and 5 show power supply cables 40, intended in particular for monitor 8. As can be seen, cables 40 pass through one of the hollow anchor rods 6. One of its ends has a connector 41 that is plugged into monitor 8 via the interior of the headrest; its other end is designed to pass through the equipped seat, so as to connect to the power supply source as well as any potential audio and video sources.

This headrest structure has a simple design and is extremely easy to assemble; it allows a complete set-up to be offered, one that is adaptable to any type of seat equipped with housing sleeves. If necessary, the system for fitting monitor 8 on support 12 is implementable independently of the principle of adjusting the distance between the anchor rods.

What is claimed is:
1. A headrest, in particular for a motor vehicle seat, comprising:
   a cushion (2);
   an integrated support (12) enclosed by said cushion (2);
   two parallel anchor rods (6) for fitting said integrated support (12) onto a receiving seat (7);
   wherein each of said anchor rods (6) has a threaded shaft (18) extending at a right angle from an upper end thereof and rigidly secured to said upper end;
   a rotatable, complementary threaded housing sleeve (19) threadably attached to each of said rigidly secured threaded shafts (18), whererby rotation of the housing sleeve (19) causes the threaded shafts (18) engaged thereby to move laterally to provide an adjustment for adjusting the lateral distance between said anchor rods (6);

a lock (22) for locking the anchor rods (6) in a set position on the sleeve (19) to thereby maintain a set lateral distance between both anchor rods (6); and securing means (24, 25, 26) for securing said housing sleeve (19) onto the integrated support (12).

2. The headrest as recited in claim 1, wherein said threading of said housing sleeve (19) is an inner threading adapted to conform with an outer threading on each of said threaded shafts (18), and, said lock (22) comprises locknuts on each of said threaded shafts (18) adapted to abut said housing sleeve (19) so as to secure the position of said anchor rods (6).

3. The headrest as recited in claim 1, wherein the housing sleeve (19) has a substantially cylindrical shape, the sleeve (19) being housed in the base of an attached flat, U-shaped stirrup piece (24), the stirrup piece (24) abutting a locking lug (30) situated on the integrated support (12) and affixed to the locking lug (30) via a screw-nut tightening system (25, 26).

4. The headrest as recited in claim 3, wherein the integrated support (12) has a seat (28) adapted to receive the sleeve (19) and the threaded shafts (18) that extend at right angles from the upper ends of the anchor rods (6) wherein said seat (28) ends at the front face of the support (12) and is positioned just below the locking lug (30) of the integrated support (12), and wherein the seat (28) has lower horizontally extending elongated openings (29) for passage of the anchor rods (6), the openings (29) being adapted to receive anchor rods (6) at different spaced distances.

5. The headrest as recited in claim 4, wherein the seat (28) of the support (12) has an opening (35) situated below the locking lug (30) in order to facilitate the positioning of the U-shaped stirrup piece (24).

6. The headrest as recited in claim 1, wherein the headrest has attached adapter sleeves (37), capable of compensating for the difference between the outer diameter of the anchor rods (6) and the inner diameter of a housing sleeve (20) installed in the upper portion of the receiving seat (7), the adapter sleeves (37) having an upper flange (38) allowing the adapter sleeves (37) to be held on the housing sleeves (20).

7. The headrest as recited in claim 1, wherein the headrest has a monitor (8) embedded in a rear face of the headrest, the monitor (8) being moveably clamped into a casing (14) which is embedded in the rear face and fixed on the integrated support (12).

8. The headrest as recited in claim 7, wherein the casing (14) is embedded in a housing (4') situated at the rear face of cushion (2), the housing (4') being delimited by a rigid frame (10) whose width essentially corresponds to the thickness of the casing (14) and along the inner rim of which the integrated support comes to rest, the base of the casing (14) being fixed to the integrated support (12) via locking screws (15) and the front face of the casing (14) being equipped with an oversize peripheral flange (16) adapted to rest against the outer rim of the rigid frame (10).

9. The headrest as recited in claim 8, wherein the headrest cushion (2) is molded onto the rigid frame (10).

10. The headrest as recited in claim 7, wherein the interior of said headrest anchor rods (6) are hollow, and power supply cables (40) of the monitor (8) pass through the interior of at least one of said anchor rods.

11. A headrest, in particular for a motor vehicle seat, comprising:

a cushion (2);

an integrated support (12) enclosed by said cushion (2);

two parallel anchor rods (6) attached to said integrated support for fitting said integrated support (12) onto a receiving seat (7);

wherein each of said anchor rods (6) has a threaded shaft (18) extending at a right angle from an upper end thereof and rigidly secured to said upper end; and a rotatable, complementary threaded housing sleeve (19) threadably attached to each of said rigidly secured threaded shafts (18), whereby rotation of the housing sleeve (19) causes the threaded shafts (18) engaged thereby to move laterally to provide an adjustment for adjusting the lateral distance between said anchor rods (6).

* * * * *